June 7, 1932.  J. R. MILLAR  1,862,384
BAG FOR COTTON PICKING MACHINES OR THE LIKE
Filed July 3, 1929  2 Sheets-Sheet 1
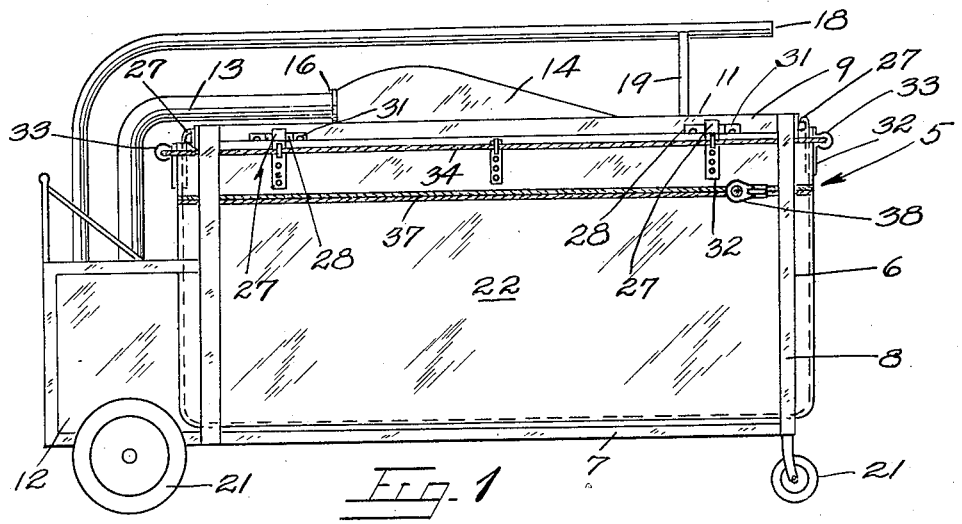
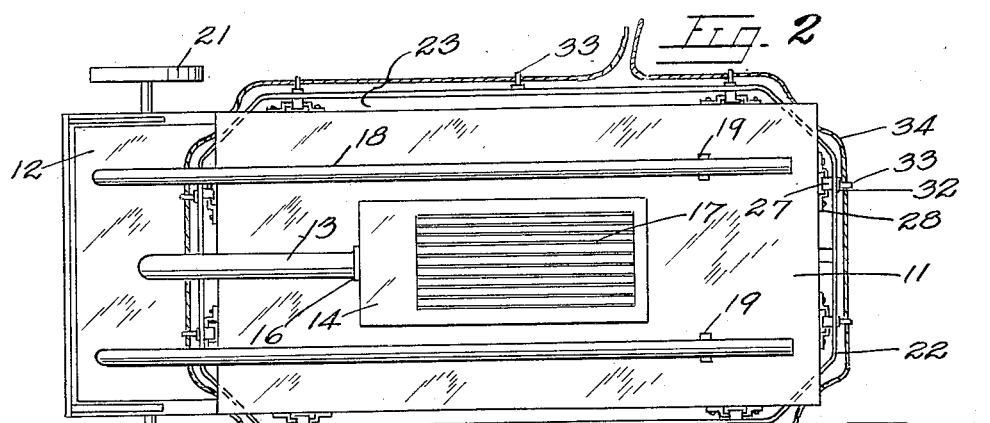
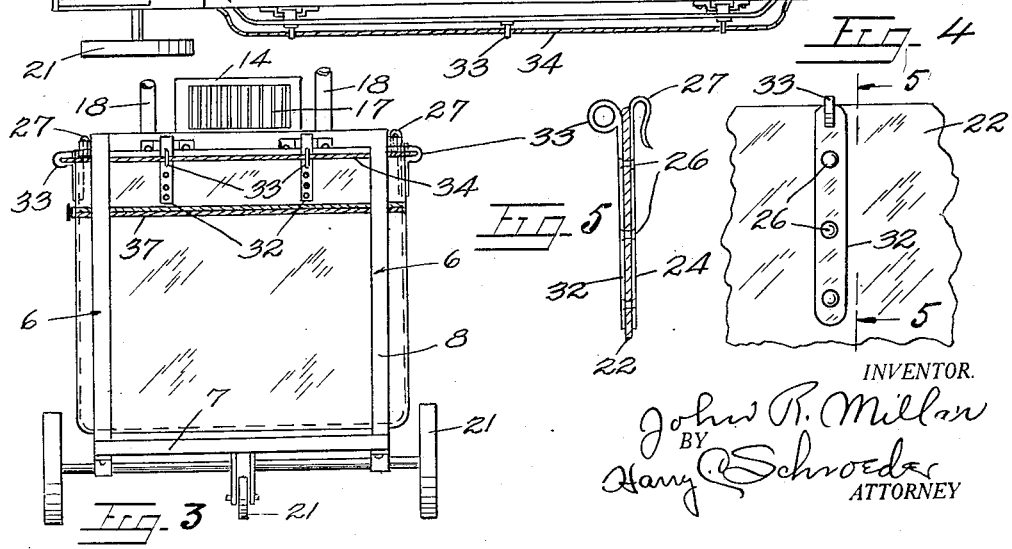

June 7, 1932.   J. R. MILLAR   1,862,384
BAG FOR COTTON PICKING MACHINES OR THE LIKE
Filed July 3, 1929   2 Sheets-Sheet 2
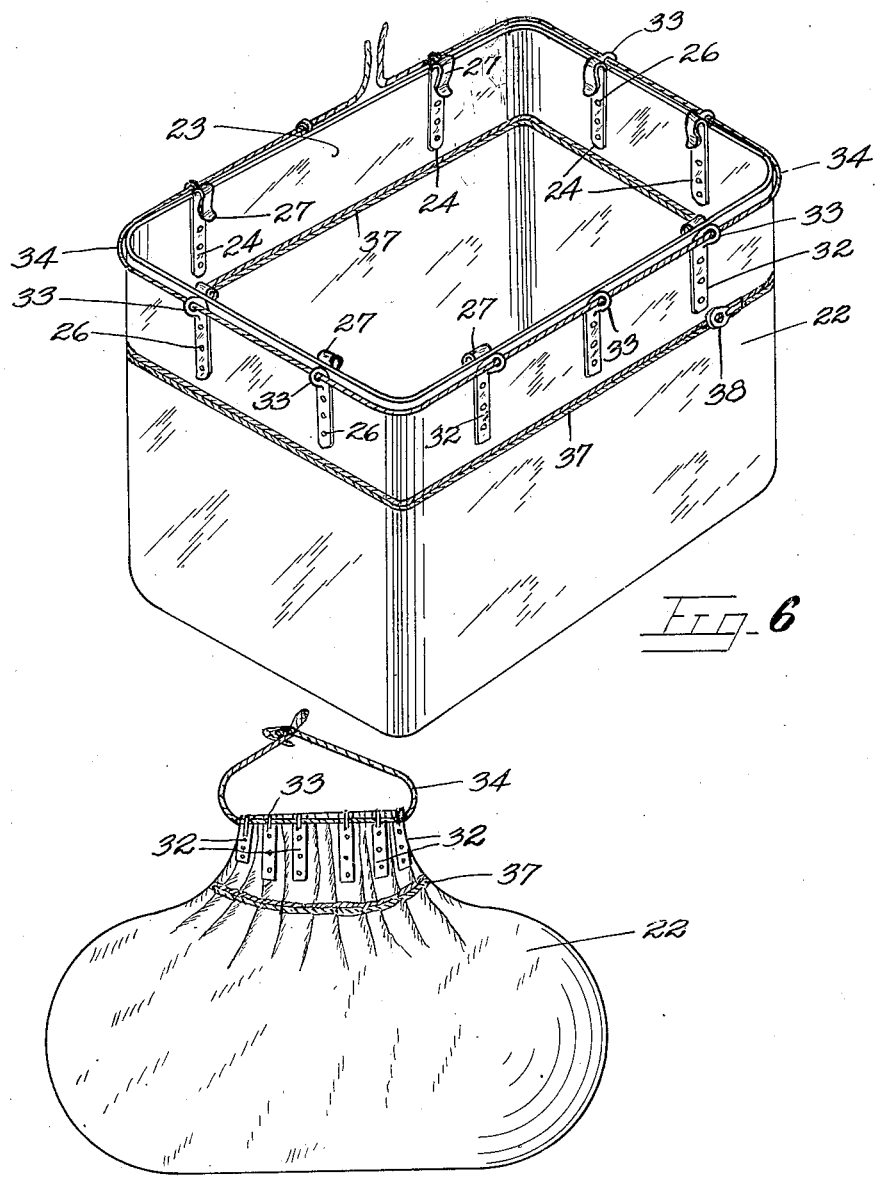
INVENTOR.
John R. Millar
BY Harry C. Schroeder
ATTORNEY

Patented June 7, 1932

1,862,384

UNITED STATES PATENT OFFICE

JOHN R. MILLAR, OF OAKLAND, CALIFORNIA

BAG FOR COTTON PICKING MACHINES OR THE LIKE

Application filed July 3, 1929. Serial No. 375,673.

The invention forming the subject matter of this application relates to a bag for cotton picking machines, and more particularly to a bag that is adapted to be attached to a cotton picking machine for receiving the cotton picked by the machine.

An object of the invention is to provide a bag that is adapted to be removably attached to the frame of a cotton picking machine for receiving the cotton picked by the machine, and which may be detached and readily transported from the field and used for storing the picked cotton, a further feature being that the bag may be replaced at the time of removal from the machine by another similar bag, thereby allowing a practically uninterrupted operation of the cotton picking machine.

Another object of the invention is to provide a bag of the character set forth which is formed by pliable material and is provided with fastening means disposed around the margin of the opening thereof for removably attaching the same to the frame of a cotton picking machine, and in which means are provided for closing the opening of the bag and for fastening the same in closed position, after the bag has been detached from the cotton picker.

Another object of the invention is to provide a pliable bag for cotton picking machines which is highly useful and simple in construction. Convenience of arrangement, lightness and comparative inexpense of manufacture are further objects which have been borne in mind in the production and development of the invention.

With the foregoing and other objects in view which will be made manifest in the following detailed description and specifically pointed out in the appended claims, reference is had to the accompanying drawings for the illustrative embodiment of the invention, wherein:

Fig. 1 is a side elevation of a cotton picking machine showing the bag forming the invention as attached thereto;

Fig. 2 is a top plan view of the cotton picking machine and bag as shown in Fig. 1;

Fig. 3 is an end elevation of the cotton picking machine, viewing the right end of Fig. 1;

Fig. 4 is a detail view of one of the fasteners used for securing the bag to the cotton picking machine;

Fig. 5 is a detail view partly shown in section and taken on the line 5—5 of Fig. 4;

Fig. 6 is a perspective view of the cotton bag forming the invention and shown in open position;

Fig. 7 is a side view of the cotton bag shown in closed position.

Referring to the accompanying drawings wherein similar reference characters designate similar parts throughout, the various figures described above adequately illustrate the invention, and the following detailed description is commensurate with the above mentioned drawings in enabling an artisan to construct and assemble the constituent parts of the same.

In carrying out my invention I make use of a cotton picking machine designated as an entirety by the reference numeral 5. Although the machine 5 may be constructed in any suitable manner other than that shown in the accompanying drawings, it is preferable and desirable to make use of a standard type of machine such as that illustrated, which machine is at the present time used for picking cotton. As illustrated, the machine 5 comprises a frame 6 of rectangular boxlike form, which frame comprises a rectangular base 7 constructed of angle iron, upright angle iron corner posts 8, and a rectangular upper frame portion 9 of the same material. The upper frame 9 is covered over by means of a plate 11 which is suitably secured thereto. Suitably mounted at one end of the frame 6 is a blower 12 having an exhaust pipe 13 which connects to an end of a domelike housing 14, as at 16, formed substantially in the center of the top plate 11. On the upper surface of the housing 14 there is formed a grille 17. Intake pipes 18 also connect with the blower 12 and extend therefrom over the top of the frame 6 and are supported on said frame by means of brackets 19. At their free end the intake pipes 18 are adapted to be coupled with hose members, not shown, each of which hose members is provided with a particular type of hose end adaptable for removing the cotton from the cotton bush. Suitable wheels 21 rotatably mounted at the forward and rearward ends of the frame 6 render the machine 5 readily transportable and allows the same to be moved between the rows of cotton bushes for harvesting the cotton crop.

In the previous description I have set forth the main features of a cotton picking machine of a type that is particularly adapted for use in connection with my invention. The device forming the subject matter of my application consists of a receptacle for receiving the cotton picked by the machine 5 and one which may be detached from the machine when full, and replaced by another similar receptacle. In this respect my invention embodies a bag 22 of rectangular form and open at one end thereof, as at 23. It is preferable that the bag 22 be constructed of a pliable material such as a canvas or the like, canvas being particularly preferred due to its durability and strength, which adapts it for this particular use. It will be noted that the canvas bag 22 is substantially the same size as the boxlike frame 6 and is adapted to fit within said frame and be supported in position therein so that the opening 23 is adjacent and directly under the top plate 11.

Means are provided for attaching the canvas bag 22 in the hereinbefore stated position with respect to the frame 6, said means comprising a plurality of spaced fastening elements 24 formed of substantially rigid metal strips which are secured to the inner surfaces of the four sides of the bag 22 adjacent the marginal edges of the opening thereof by means of rivets 26. At the outer ends thereof the metal strips 24 are rebent inwardly so as to form hooks 27. It will be seen that there are two of the fasteners 24 secured to each side of the bag 22. An equal number of sockets 28 are disposed on the outer surfaces of the four sides of the upper rectangular frame portion 9 in spaced relation, corresponding to the spacing of the fasteners 24 on the bag 22. Each of the sockets 28 are formed of a strip of metal bent into a U shape and secured to the frame 9 by means of bolts or rivets 31.

To support the bag 22 in the frame 6 merely necessitates engaging the hooks 27 in the sockets 28 which supports the bag 22 in the desired position under the top 11 in the manner clearly shown in Fig. 1. When the cotton picking machine 5 is operated the cotton is removed from the bush by means of the hereinbefore described hose and is drawn into the intake pipe 18 by means of the suction generated by the blower 12, into said blower whereupon it is exhausted from the blower into the pipe 13. The pipe 13 delivers the cotton to the domelike housing 14, which it is to be noted is open at the bottom for allowing the cotton to drop into the bag 22. Air at atmospheric pressure enters through the grille 17 for forcing the cotton into the bag 22. When the bag 22 has received a sufficient quantity of cotton in this manner the same is removed from the frame 6 by disengaging the several hooks 24 from the sockets 28 and is replaced by another empty bag of similar construction.

Means have been provided for drawing the opening 23 of the bag 22 closed and fastening the same in closed position. In this respect there is provided a plurality of substantially rigid metal strips 32 similar to the metal fasteners 24 and secured to the outside surfaces of the sides of the bag 22 adjacent the marginal edges of the opening 23. In some instances the metal strips 32 are positioned adjacent the fasteners 24 and are secured to the bag 22 by means of the same rivets 26 which extend through both members. It is preferable that the metal strips 32 be equally spaced apart, and for this reason six of the said metal strips are provided to four of the fasteners 24. The two extra strips are disposed in the center of the opposite longitudinal sides of the bag 22.

Formed on the upper or outer ends of each of the metal strips 32 is an eyelet 33, clearly shown in Figs. 4 and 5. A rope or cord 34 is threaded through the eyelets 33 so as to extend completely around the bag 22, the ends thereof being loose when the bag is attached to the frame 6, as shown in Fig. 2. To close the opening 23, after the bag has been detached from the machine 5, consists in merely drawing in the ends of the cord 34 which contracts the marginal edges of the opening until the same has become completely closed. The ends of the cord 34 are then tied in a knot and the bag of picked cotton is ready to be transported from the field. Fig. 7 clearly illustrates the bag 22 in closed position.

In order to facilitate the releasing of the cotton from the bag 22 the same is provided with a peripheral slot which is formed in the bag adjacent the open end thereof. Normally the edges of the slot are held together by means of a separable fastener arrangement 37 of the usual type, wherein a slide 38 releases the fasteners 37 causing the partial separation of the lower portion from the upper portion, allowing the cotton to be emptied from the bag 22.

From the foregoing, it is thought that the construction, use and many advantages of the herein described device will be readily understood without further description, and it will also be understood that changes in the form, proportion and minor details of construction may be resorted to without departing from the spirit of the invention or sacrificing any of the advantages thereof.

What I claim is:—

1. A bag for cotton picking machines comprising a substantially rectangular form of fabric material consisting of four sides and bottom and provided with a plurality of inwardly disposed hooks and outwardly disposed eyes riveted together with interposed fabric at the top thereof, said bag comprising an upper and a lower section connected together by means of a continuous separable fastener.

2. A bag for cotton picking machines comprising a substantially rectangular form of fabric material having four sides and bottom, said sides being divided into an upper and lower section detachably secured by a continuous separable fastener, the upper edge of the upper section of said sides having inwardly disposed hooks and outwardly disposed eyes secured together with interposed fabric, said hooks being adapted to cooperate with receiving means on a cotton picking machine, said eyes being adapted to receive a cord for closing the mouth of said container.

3. A bag for cotton picking machines comprising a substantially rectangular form of pliable material having four sides and bottom, said sides being divided in a plane parallel to said bottom and being secured together by means of separable fasteners, a plurality of spaced hooks affixed to the inside upper edge of the upper section and a plurality of eyes forming reinforcement on the outside, said hooks being adapted to cooperate with receiving members on the frame of a cotton picking machine, said eyes having a cord passed therethrough in series for drawing the mouth of said bag into closed position.

4. A bag for cotton picking machines comprising a substantially rectangular form of pliable material, suspending hooks and drawstring eyes of rigid material disposed on opposite sides of said pliable material and secured together through said material.

In testimony whereof I have affixed my signature.

JOHN R. MILLAR.